United States Patent
Zhai et al.

(10) Patent No.: US 10,572,323 B1
(45) Date of Patent: Feb. 25, 2020

(54) PREDICTING PHYSICAL STORAGE UNIT HEALTH

(71) Applicant: EMC IP Holding Company LLC, Hopkinton, MA (US)

(72) Inventors: Haifang Zhai, Shanghai (CN); Peter Pan, Shanghai (CN); Norton Luo, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 15/791,485

(22) Filed: Oct. 24, 2017

(51) Int. Cl.
*G06F 11/00* (2006.01)
*G06F 11/30* (2006.01)

(52) U.S. Cl.
CPC ........ *G06F 11/004* (2013.01); *G06F 11/3034* (2013.01); *G06F 2201/81* (2013.01)

(58) Field of Classification Search
CPC .............. G06F 11/004; G06F 11/0727; G06F 11/0754; G06F 11/0757; G06F 11/76; G06F 11/0793; G06F 11/2094; G06F 11/2221; G06F 11/3034; G06F 3/0617; G06F 3/0616; G06F 3/0619; G06F 3/0653

See application file for complete search history.

(56) References Cited

U.S. PATENT DOCUMENTS

| | | | | |
|---|---|---|---|---|
| 6,598,174 B1* | 7/2003 | Parks | .................... | G06F 11/008 711/162 |
| 7,574,623 B1* | 8/2009 | Goel | .................... | G06F 11/008 714/47.2 |
| 9,189,309 B1* | 11/2015 | Ma | ....................... | G06F 11/3034 |
| 9,535,779 B1* | 1/2017 | Ma | ......................... | G06F 11/076 |
| 10,013,321 B1* | 7/2018 | Stern | .................... | G06F 11/2069 |
| 2002/0091965 A1* | 7/2002 | Moshayedi | ........... | G06F 11/004 714/6.13 |
| 2005/0086557 A1* | 4/2005 | Sato | ...................... | G06F 11/008 714/6.12 |
| 2005/0262385 A1* | 11/2005 | McNeill, Jr. | .......... | G06F 11/008 714/6.2 |
| 2005/0268147 A1* | 12/2005 | Yamamoto | ............ | G06F 3/0617 714/2 |
| 2005/0283655 A1* | 12/2005 | Ashmore | .............. | G06F 11/004 714/6.32 |

(Continued)

*Primary Examiner* — Gabriel Chu
(74) *Attorney, Agent, or Firm* — Muirhead and Saturnelli, LLC

(57) ABSTRACT

Maintaining a data storage device having a plurality of physical storage units includes constructing a model that predicts failure of the physical storage units in the data storage device, where the model is trained using empirical data containing operational parameters of physical storage units, determining failure predictions of the physical storage units in the data storage device using the model, moving applications in the data storage device based on the failure predictions of the physical storage units in the data storage device, and maintaining the physical storage units in the data storage device according to the failure predictions of the physical storage units in the data storage device. The model may be constructed using a Random Forest Classifier model from the Scikit-Learn software package. Using empirical data containing operational parameters of physical storage units may include accessing publicly available empirical data.

16 Claims, 6 Drawing Sheets

(56) References Cited

U.S. PATENT DOCUMENTS

| | | | |
|---|---|---|---|
| 2006/0149900 A1* | 7/2006 | Terry | G06F 11/1662 |
| | | | 711/114 |
| 2007/0079170 A1* | 4/2007 | Zimmer | G06F 11/008 |
| | | | 714/6.23 |
| 2009/0271657 A1* | 10/2009 | McCombs | G06F 11/004 |
| | | | 714/6.2 |
| 2010/0070796 A1* | 3/2010 | Sivaperuman | G06F 11/2094 |
| | | | 714/5.1 |
| 2010/0287542 A1* | 11/2010 | Neft | G06F 8/31 |
| | | | 717/140 |
| 2010/0318837 A1* | 12/2010 | Murphy | G06F 11/008 |
| | | | 714/4.1 |
| 2011/0022776 A1* | 1/2011 | Hekstra | G06F 11/1008 |
| | | | 711/103 |
| 2011/0313974 A1* | 12/2011 | Chen | G06F 11/1451 |
| | | | 707/654 |
| 2013/0339304 A1* | 12/2013 | Lee | G05B 1/01 |
| | | | 707/652 |
| 2014/0188797 A1* | 7/2014 | Araki | G06F 11/1451 |
| | | | 707/624 |
| 2014/0201576 A1* | 7/2014 | Wu | G06F 11/3058 |
| | | | 714/47.2 |
| 2015/0378986 A1* | 12/2015 | Amin | G06F 17/24 |
| | | | 704/9 |
| 2017/0017557 A1* | 1/2017 | Oshima | G06F 11/2094 |
| 2017/0102883 A1* | 4/2017 | Atluri | G06F 3/0605 |

* cited by examiner

PREDICTING PHYSICAL STORAGE UNIT HEALTH

TECHNICAL FIELD

This application relates to the field of computer systems and storage devices therefor and, more particularly, to the field of physical storage units used with storage devices.

BACKGROUND OF THE INVENTION

Data array storage systems may include a plurality of host interface units (I/O modules), physical storage units (e.g., disk drives, SSD drives, etc.), and disk interface units (disk adapters) that are coupled to and used to control the storage units. Host systems coupled to the data array storage systems access data and provide control information through channels connected to the data array storage system. The host systems and applications thereon do not address the physical storage units of the data array storage system directly, but rather, access what appears to the host systems as a plurality of logical storage units. A particular one of the logical storage units may or may not correspond to any particular one of the physical storage units and, often, there is a more complex relationship between physical storage units and logical storage units.

A data array storage system may be vulnerable to performance degradation when one or more of the physical storage units fails. In addition, the relatively large number of individual physical storage units increases the likelihood of failure. Of course, data may be protected using conventional mechanisms, such as RAID arrays that span multiple physical storage units, regular data backups, etc. However, recovering from failures (e.g., restoring data backups, rebuilding RAID arrays, etc.) is time consuming and impacts performance. Also, in some cases, data on the storage device is not available until recovery is complete. In a system where physical storage units are not replaced until failure, inefficiencies associated with data recovery are expected.

Accordingly, it is desirable to be able to reliably predict failure of physical storage units to be able to migrate applications/data therefrom and possibly provide replacements prior to failure.

SUMMARY OF THE INVENTION

According to the system described herein, maintaining a data storage device having a plurality of physical storage units includes constructing a model that predicts failure of the physical storage units in the data storage device, where the model is trained using empirical data containing operational parameters of physical storage units, determining failure predictions of the physical storage units in the data storage device using the model, moving applications in the data storage device based on the failure predictions of the physical storage units in the data storage device, and maintaining the physical storage units in the data storage device according to the failure predictions of the physical storage units in the data storage device. Maintaining the physical storage units in the data storage device may include replacing a first set of the physical storage units in the data storage device predicted to fail by a first time and scheduling for future replacement a second set of the physical storage units in the data storage device that are predicted to fail after the first time but before a second time. The first time may be one month and the second time may be two months. The model may be constructed using a Random Forest Classifier model from the Scikit-Learn software package. Using empirical data containing operational parameters of physical storage units may include accessing publicly available empirical data. Moving applications may include moving applications deemed critical from the physical storage units in the data storage device that are predicted to fail. Moving applications may include moving applications deemed non-critical on to the physical storage units in the data storage device that are predicted to fail. The physical storage units may include disk drives and solid state drives. A host computing device, coupled to the data storage device, may determine the failure predictions. The host computing device may move the applications on the data storage device.

According further to the system described herein, a non-transitory computer-readable medium contains software that maintains a data storage device having a plurality of physical storage units. The software includes executable code that constructs a model that predicts failure of the physical storage units in the data storage device, wherein the model is trained using empirical data containing operational parameters of physical storage units, executable code that determines failure predictions of the physical storage units in the data storage device using the model, executable code that moves applications in the data storage device based on the failure predictions of the physical storage units in the data storage device, and executable code that maintains the physical storage units in the data storage device according to the failure predictions of the physical storage units in the data storage device. Executable code that maintains the physical storage units in the data storage device may mark for replacement a first set of the physical storage units in the data storage device predicted to fail by a first time and may schedule for future replacement a second set of the physical storage units in the data storage device that are predicted to fail after the first time but before a second time. The first time may be one month and the second time may be two months. The model may be constructed using a Random Forest Classifier model from the Scikit-Learn software package. Using empirical data containing operational parameters of physical storage units may include accessing publicly available empirical data. Applications deemed critical may be moved from the physical storage units in the data storage device that are predicted to fail. Applications deemed non-critical may be maintained on to the physical storage units in the data storage device that are predicted to fail. The physical storage units may include disk drive and solid state drives. A host computing device, coupled to the data storage device, may include the executable code that determines the failure predictions. The host computing device may include the executable code that moves the applications on the data storage device.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
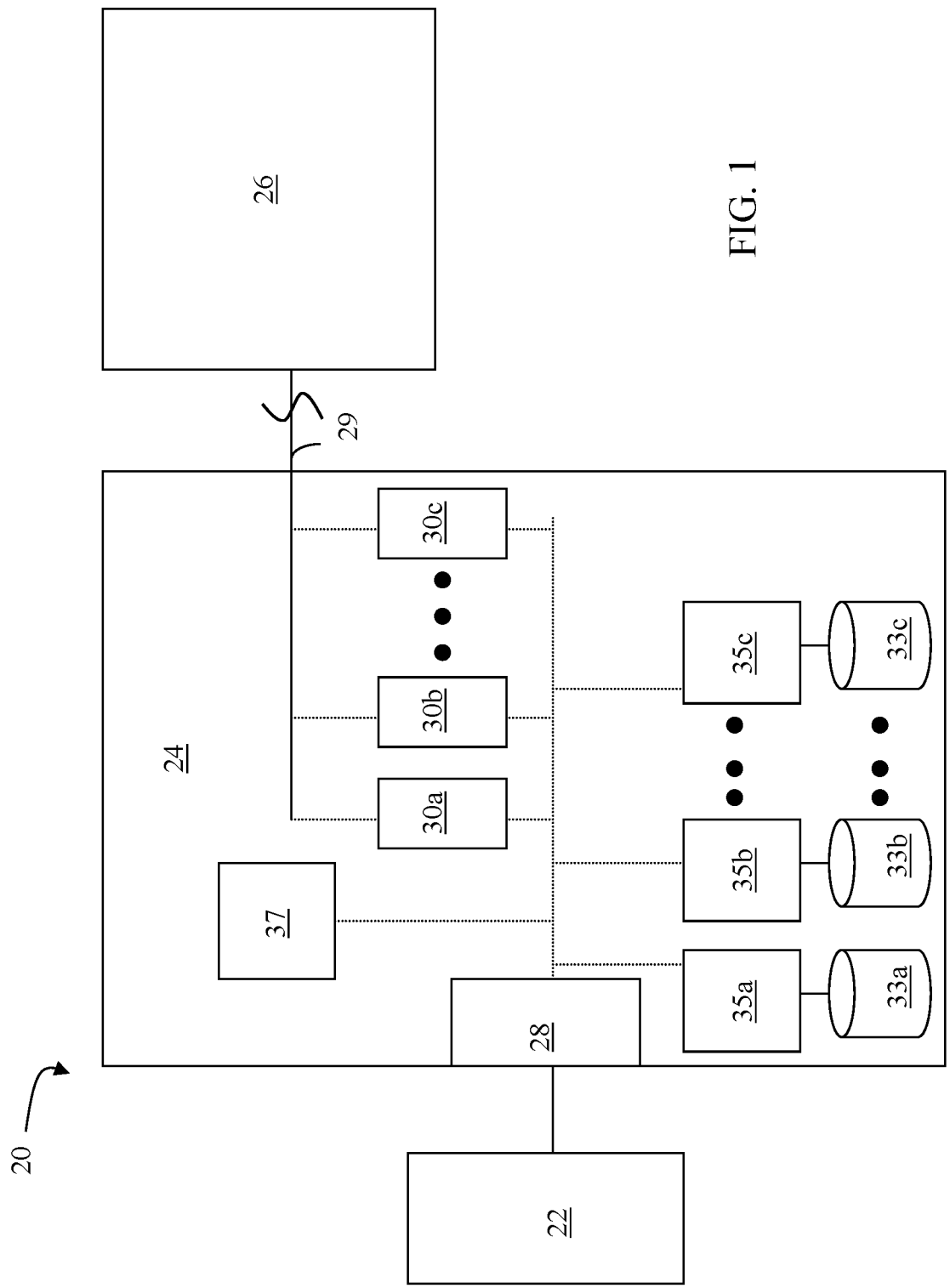
FIG. 1 is a schematic diagram of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with embodiments of the system described herein. In an embodiment, the storage device 24 may be a Symmetrix storage system produced by EMC Corporation of Hopkinton, Mass.; however, the system described herein may operate with other appropriate types of storage devices, including other types of disk array storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process, that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include a plurality of physical storage units 33a-33c, each containing a different portion of data stored on the storage device 24. The physical storage units 33a-33c may be disk drives and/or solid-state storage devices. The storage device 24 (and/or the remote storage device 26) may be provided as a stand-alone device coupled to the host 22 as shown in FIG. 1 or, alternatively, the storage device 24 (and/or the remote storage device 26) may be part of a storage area network (SAN) that includes a plurality of other storage devices as well as routers, network connections, etc. (not shown). The storage devices 24, 26 may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding one of a plurality of disk adapter units (DAs) 35a-35c that provide data to a corresponding one of the physical storage units 33a-33c and receives data from a corresponding one of the physical storage units 33a-33c. An internal data path exists between the DA's 35a-35c, the HA 28 and the RA's 30a-30c of the storage device 24. Note that, in other embodiments, it is possible for more than one physical storage unit to be serviced by a single DA and that it is possible for more than one DA to service one of the physical storage units 33a-33c. The storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and/or the RA's 30a-30c, and may contain a cache for data fetched from one or more of the physical storage units 33a-33c.

The storage space in the storage device 24 that corresponds to the physical storage units 33a-33c may be subdivided into a plurality of volumes or logical devices. The logical devices may or may not correspond to the physical storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage device 26 may be subdivided into a plurality of volumes or logical devices, where each of the logical devices may or may not correspond to one or more physical storage units of the remote storage device 26.

Figure 2:
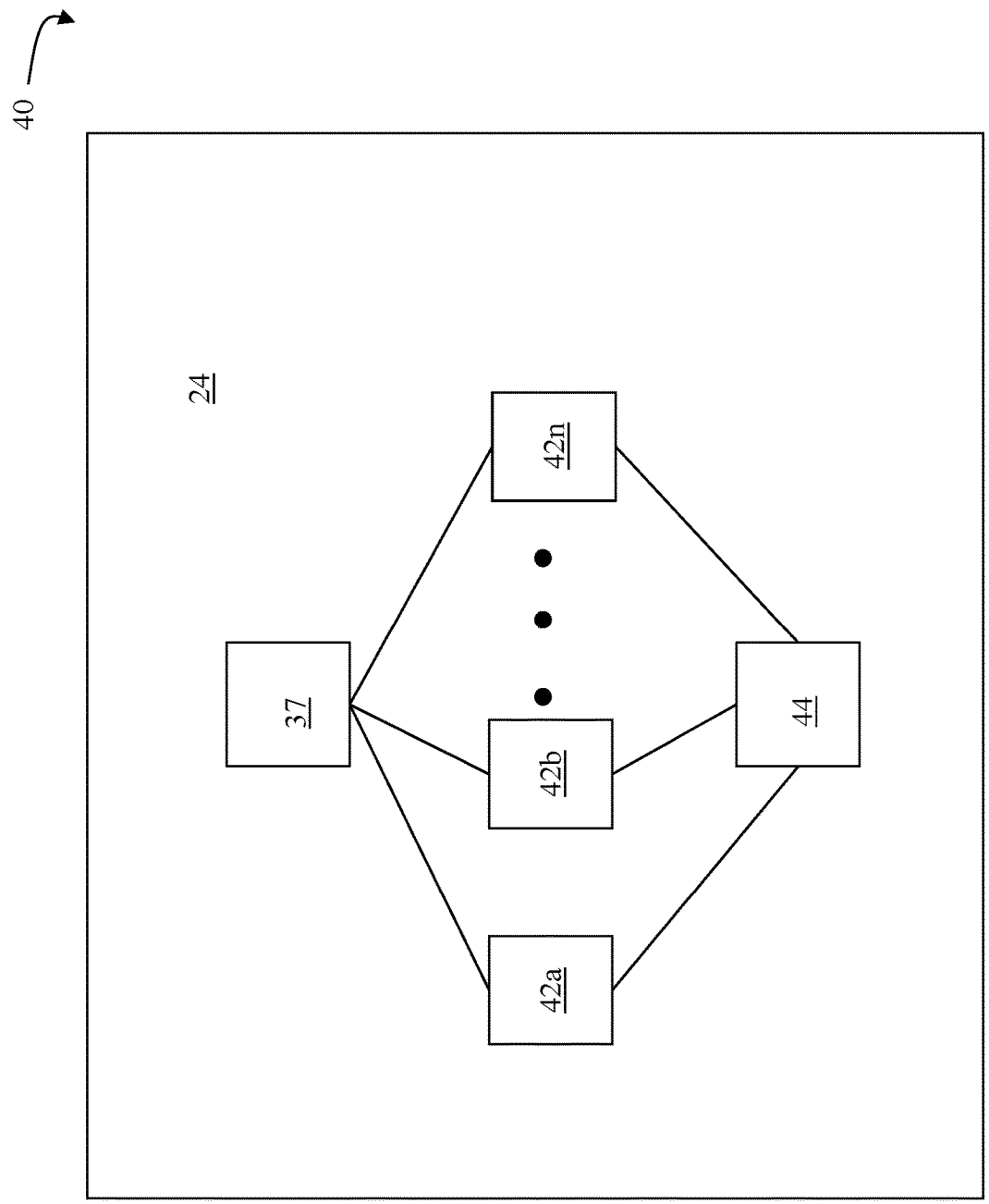
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Figure 3:
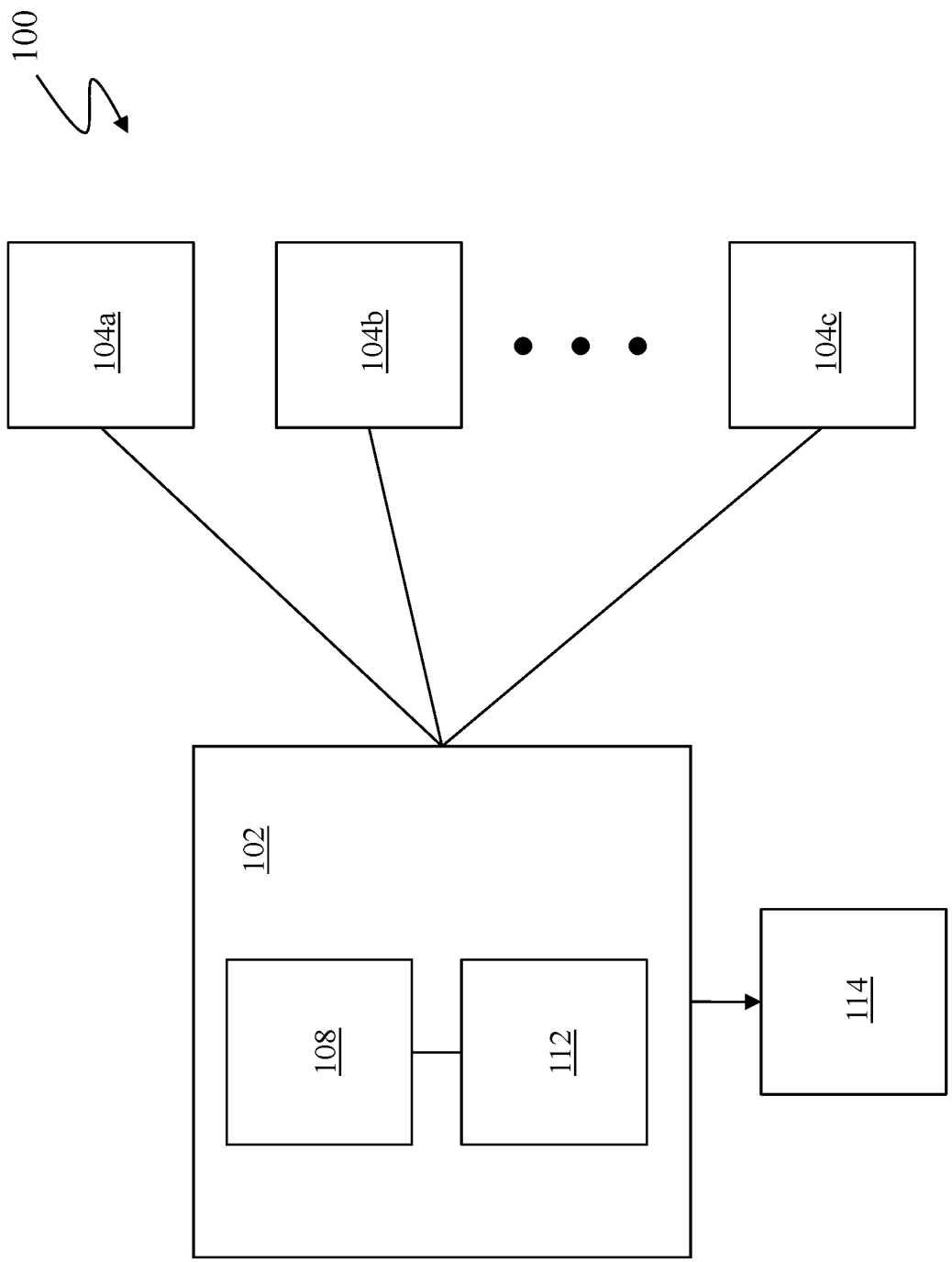
FIG. 3 is a schematic diagram illustrating a system used to predict physical storage unit health according to an embodiment of the system described herein.

Referring to FIG. 3, a diagram 100 shows a computing device 102 coupled to a plurality of storage devices 104a-104c. The computing device 102 may be like the host 22, described above, or may be another type of computing device, such as a laptop computer, a tablet, etc. that is capable of providing the processing described herein. The storage devices 104a-104c are like the storage devices 24, 26 described above and contain a plurality of physical storage units (not shown in FIG. 3), such as disk drives and SSD memory devices. Data from the physical storage units of the storage devices 104a-104c is provided to the computing device 102, which provides predictions for physical storage unit failures, as described in more detail elsewhere herein. The computing device 102 may provide control information to one or more of the storage devices 104a-104c to move applications thereon and possibly perform other remedial actions, as described in more detail elsewhere herein.

The computing device 102 includes management and orchestration (M&O) software 108 and a failure model 112 that predicts failures of the physical storage units of the storage devices 104a-104c. The M&O software 108 runs the failure model 112, handles collection of data about the physical storage units from the storage devices 104a-104c, moves applications on the storage devices 104a-104c (described in detail elsewhere here) and generally orchestrates the functionality for the system. In an embodiment herein, the M&O software 108 may be implemented using the RackHD software suite, provided by Dell/EMC Corporation and available as a collection of open source software modules (libraries and applications) on the Internet. See, for example, the following Web page: https://rackhd.atlassian.net/wiki/spaces/RAC1/pages/15761410/RackHD+Release+Page Of course, products/systems other than RackHD may be used in place of RackHD to implement functionality of the M&O software 108.

The failure model 112 uses data from the physical storage units of the storage devices 104a-104c to predict physical storage units that fall into one of three groups: a first group corresponding to physical storage units that are expected to fail within one month, a second group of physical storage units that are expected to fail between one month and two months, and a third group of physical storage units that are not expected to fail within two months. Of course, different time durations could be used and a different number of groups could be used. Operation and implementation of the failure model 112 is described in more detail elsewhere herein. At least some results from the failure model 112 may be output to a data file (not shown), such as a spreadsheet file, and/or to a screen 114 that is coupled to the computing device 102. Also, as discussed elsewhere herein, at least some results from the failure model 112 may be used by the M&O software 108 for remedial actions.

The failure model 112 may be constructed using the Scikit-Learn software package that is available at http://scikit-learn.org/stable/index.html. The Scikit-Learn software package is open source software that is publicly available and offers a number of different model templates for analyzing data. In an embodiment herein, a Random Forest Classifier model from the Scikit-Learn software package is used, but of course it is possible to use other/different models and also to use other modeling/learning mechanisms, such as a neural net. In an embodiment herein, the Random Forest Classifier model from the Scikit-Learn software package is trained using publicly-available drive parameter data and failure instances, which is discussed in more detail elsewhere herein. After training, the model 112 predicts failures of the physical storage units of the storage devices 104a-104c.

Figure 4:
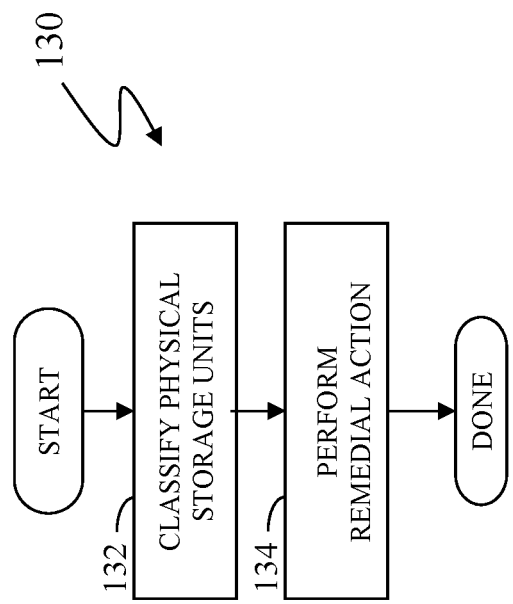
FIG. 4 is a flow diagram illustrating operating a system used to predict physical storage unit health according to an embodiment of the system described herein.

Referring to FIG. 4, a flow diagram 130 illustrates steps for operating the system described herein. Processing begins at a first step 132 where the M&O software 108 causes the failure model 112 to classify the physical storage units. As discussed elsewhere herein, the physical storage units may be classified as either predicted to fail within one month, predicted to fails after one month but before two months, and predicted not to fail (within two months), but of course other classification groups are possible. Following the step 132 is a step 134 where remedial action is taken based on the classification of the physical storage units. Note that the remedial action performed at the step 134 is implementation dependent and could vary depending on the requirements of the system and choices made by system designers. Examples of remedial action could include replacing physical storage units immediately (e.g., for physical storage units expected to fail within a month), scheduling physical storage units for replacement at a next maintenance cycle, moving critical applications/data from a physical storage unit expected to fail to a physical storage unit that is not expected to fail, and moving non-critical applications/data to physical storage units expected to fail (to make room on physical storage units not expected to fail). Note that, in some cases the remedial action performed at the step 134 may be automated and performed using the M&O software 108 (or similar) and, in other cases, the remedial action may be performed manually (at least in part) at the step 134 where a user observes information about the physical storage units on the screen 114. Specific examples of remedial action are discussed elsewhere herein. Following the step 134, processing is complete. Note that at least some of the processing illustrated by the flow diagram 130 may be performed periodically by the computing device 102.

Figure 5:
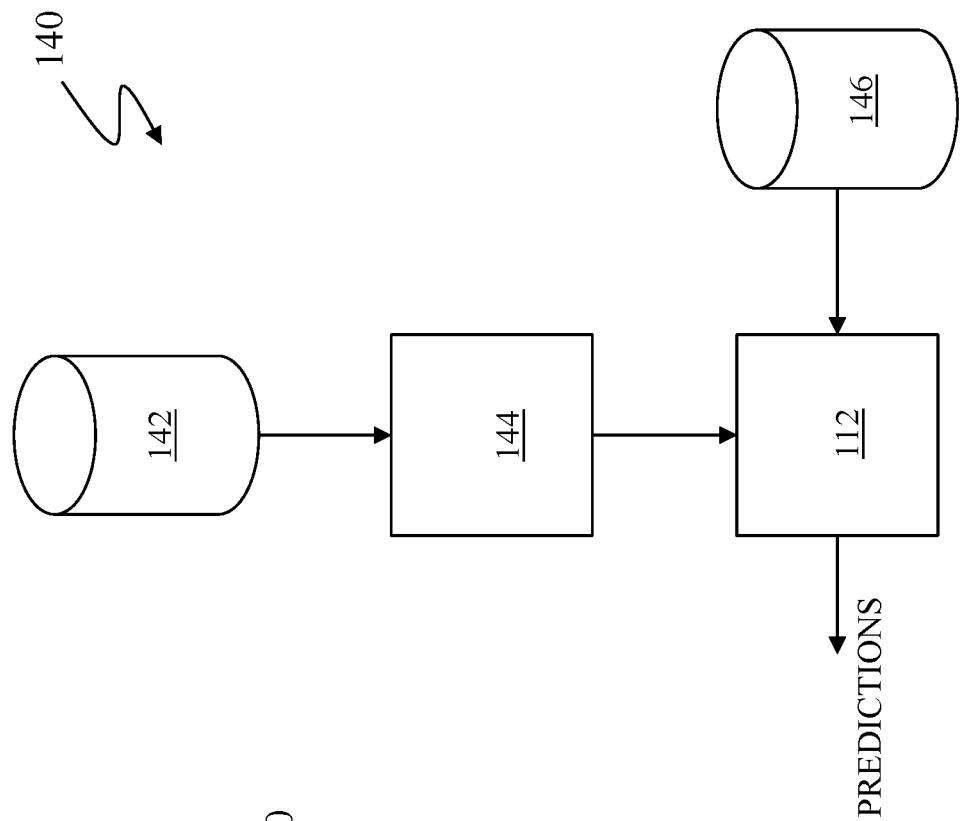
FIG. 5 is a schematic diagram illustrating training a failure model for a system used to predict physical storage unit health according to an embodiment of the system described herein.

Referring to FIG. 5, a schematic diagram 140 illustrates formulating the failure model 112. As discussed elsewhere herein, a possible implementation of the failure model 112 uses the Random Forest Classifier of the Scikit-Learn software package at http://scikit-learn.org/stable/index.html, but of course other implementations are possible, including using a neural net. The failure model 112 is initially trained using operational parameters from empirical physical storage unit data 142, which is actual data including various device parameters and failure instances. The data 142 may be publicly available from a number of sources, such as from the Backblaze company at https://www.backblaze.com/blog-smart-stats-2014-8.html. The data 142 may include conventional S.M.A.R.T (Self-Monitoring, Analysis and Reporting Technology) parameters. It is also possible to use other data/parameters, such as disk vendor data, SAS data (log-page, log-sense), protocol information (SAS/SATA/Fiber Channel), media information (SSD/HDD), workload (e.g., number of read/write throughput per hour), disk working temperature/max temperature, and/or SSD attributes such as write count.

The data 142 is provided to a module 144 that causes some of the data 142 to be used to train the model 112 and the remainder of the data 142 to be used to test the model 112 after the model 112 has been trained. In an embodiment herein, the model 112 is tested to determine if the model 112 is accurate at least a certain percentage instances. For example, the model could be tested to determine if physical storage units that are predicted to fail within one month actually fail with one month (based on the test data). The data 142 contains both the parameters being used for the model 112 as well as information indicating which physical storage units failed and when the failure occurred. If the model 112 is accurate, for example, more than seventy percent of the time, then it is determined that the model 112 is acceptable. Otherwise, more data may be obtained and used to continue to train and test the model 112.

Once the failure model 112 is being used by the computing device 102, the model 112 receives data 146 corresponding to actual operational parameters from the physical storage units of the storage devices 104a-104c. The operational parameters provided in the data 146 are the same (or nearly the same) as parameters in the data 142 used to train the model 112. The model outputs predictions for failures for the physical storage units based in the data 146. Note that it is also possible for the M&O software 108 (and/or a user directly) to adjust the model 112 based on the data 146 by indicating which specific physical storage units actually failed and when the failure occurred. Thus, the failure model 112 may be continuously updated by presenting the data 146 to the failure module 112 in a way that allows the failure model 112 to be updated/improved.

Figure 6:
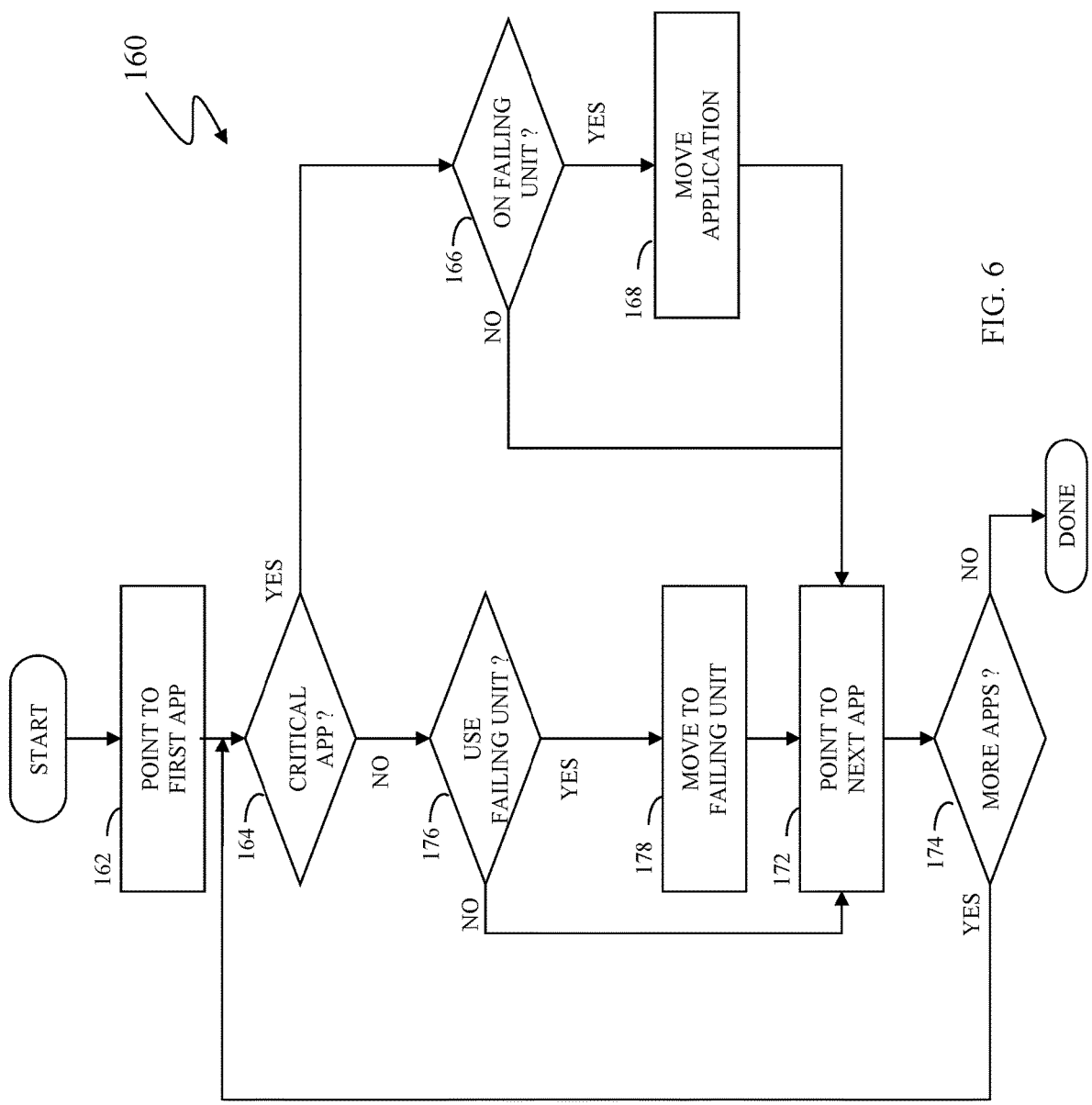
FIG. 6 is a flow diagram illustrating moving critical applications in a system used to predict physical storage unit health according to an embodiment of the system described herein.

Referring to FIG. 6, a flow diagram 160 illustrates processing performed in connection with moving applications on one of the storage devices 104a-104c based on results from classifying the physical storage units. The processing illustrated by the flow diagram 160 illustrates at least some of the processing performed at the step 134, discussed above, where remedial action is performed based on the results of classification of the physical storage units. Processing begins at a first step 162 where a pointer that iterates through all of the applications on one of the storage devices 104a-104c is used to point to each application being processed. Following the step 162 is a test step 164 where it is determined if the particular application indicated by the pointer is a critical application. Note that whether an application is "critical" is system dependent and could depend upon the needs of particular users. For example, a banking application could be deemed critical if it is important that the application be always running and not experience any performance degradation (i.e., that occurs, for example, when a RAID array is being rebuilt after a failure). As another example, an application that includes business archive data that is rarely accessed may be deemed non-critical.

If it is determined at the test step 164 that the particular application indicated by the pointer is a critical application, then control passes from the step 164 to a test step 166 where it is determined if the application (and/or data therefor) is stored on a physical storage unit that is failing (i.e., predicted to fail by the failure model 112). If so, then control transfers from the test step 166 to a step 168 where the application is moved to a physical storage unit (e.g., disk drive) that is not failing. Otherwise, control transfers from the step 166 to a step 172 where the iteration pointer that iterates through the applications is incremented. Note that the step 172 is also reached directly from the step 168. Following the step 172 is a test step 174 where it is determined if there are more applications to process (i.e., whether all of the applications have been examined). If there are no more applications to process/examine, then processing is complete. Otherwise, control transfers back to the test step 164 to process the next application.

If it is determined at the test step 164 that the particular application indicated by the pointer is a not critical application, then control passes from the test step 164 to a test step 176 where it is determined whether to move the non-critical application to a failing physical storage unit (a physical storage unit that is predicted to fail in the near future). The determination at the test step 176 may be based on system policy (e.g., a policy to always move non-critical applications to failing physical storage units) and, of course, may depend on whether the non-critical application is already on a failing physical storage unit, in which case the application does not need to move. If it is determined at the test step 176 that the non-critical application is to be moved to a failing physical storage unit, then control transfers from the test step 176 to a step 178 where the non-critical application is moved to the failing physical storage unit. Following the step 178 is the step 172, discussed above, where the iteration pointer that iterates through the applications is incremented. Note that the step 172 is also reached from the test step 176 if it is determined at the step 176 not to use the failing physical storage unit for the non-critical application. Following the step 172 is the test step 174, discussed above.

Figure 7:
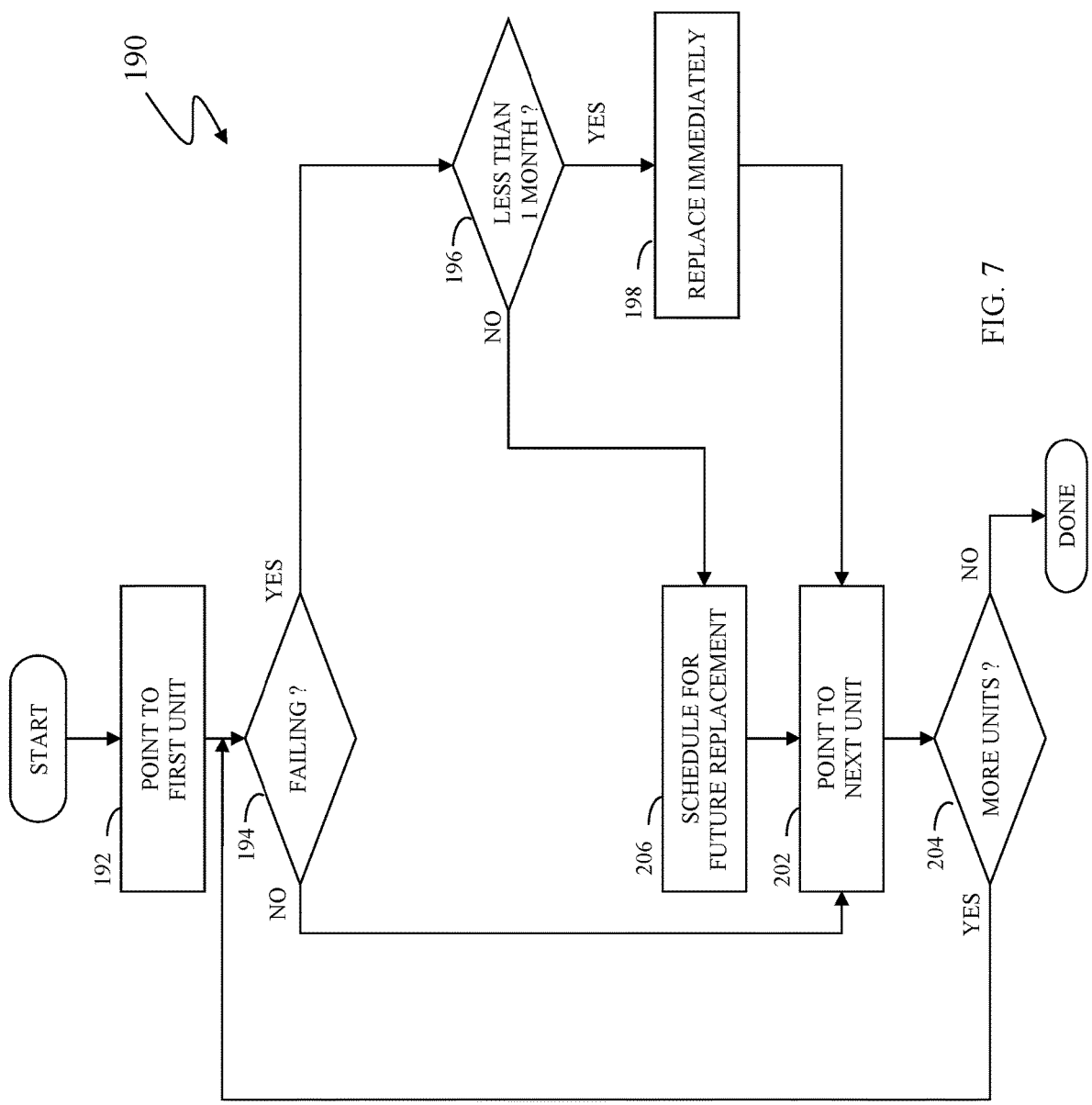
FIG. 7 is a flow diagram illustrating handling units expected to fail in a system used to predict physical storage unit health according to an embodiment of the system described herein.

Referring to FIG. 7, a flow diagram 190 illustrates processing performed in connection with using the system described herein in connection with maintenance for physical storage units of one of the storage devices 104a-104c based on results from classifying the physical storage units. The processing illustrated by the flow diagram 190 illustrates at least some of the processing performed at the step 134, discussed above, where remedial action is performed based on the results of classification of the physical storage units. Processing begins at a first step 192 where a pointer that iterates through all of the physical storage units on one of the storage devices 104a-104c is used to point, one at a time, to each physical storage unit being processed. Following the step 192 is a test step 194 where it is determined if the particular physical storage unit indicated by the pointer is predicted to fail, as discussed elsewhere herein.

If it is determined at the test step 194 that the particular physical storage unit indicated by the pointer is predicted to fail, then control passes from the step 194 to a test step 196 where it is determined if the physical storage unit is expected to fail in less than one month. If so, then control transfers from the test step 196 to a step 198 where the physical storage unit is replaced (i.e., a service technician is provided with an indicator/message to replace the physical storage unit). Following the step 198 is a step 202 where the iteration pointer that iterates through the physical storage units is incremented. Following the step 202 is a test step 204 where it is determined if there are more physical storage units to process (i.e., whether all of the physical storage units have been examined). If so, then processing is complete. Otherwise, control transfers back to the test step 194 to process the next physical storage unit.

If it is determined at the test step 196 that the physical storage unit is not expected to fail in less than one month, then control transfers from the step 196 to a step 206 where the physical storage unit is scheduled for future replacement (e.g., at the next regularly scheduled service visit) since the physical storage unit is expected to fail some time after one month. Following the step 206 is the step 202, discussed above, where the iteration pointer that iterates through the physical storage units is incremented. Note that the step 202 is also reached directly from the test step 194 if it is determined that the physical storage unit corresponding to the iteration pointer is not failing. Following the step 202 is the test step 204 where it is determined if there are more physical storage units to process. If not, then control transfers back to the test step 194 to process the next physical storage unit. Note that, in the case of physical storage units that are replaced and/or physical storage units scheduled to be replaced, it is possible to include ordering additional stock to replace the physical storage units used for replacements.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of maintaining a data storage device having a plurality of physical storage units, comprising:
constructing a model that predicts failure of the physical storage units in the data storage device, wherein the model is trained using empirical data containing operational parameters of physical storage units;
determining failure predictions of the physical storage units in the data storage device using the model;
moving non-critical applications in the data storage device on to ones of the physical storage units that are predicted to fail;
replacing a first set of the physical storage units in the data storage device predicted to fail by a first fixed amount of time; and
scheduling for future replacement a second set of the physical storage units in the data storage device that are predicted to fail after the first fixed amount of time but before a second fixed amount of time.

2. The method of claim 1, wherein the model is constructed using a Random Forest Classifier model from the Scikit-Learn software package.

3. The method of claim 1, wherein using empirical data containing operational parameters of physical storage units includes accessing publicly available empirical data.

4. The method of claim 1, further comprising:
moving applications deemed critical from the physical storage units in the data storage device that are predicted to fail.

5. The method of claim 1, wherein the physical storage units include disk drives and solid state drives.

6. The method of claim 1, wherein a host computing device, coupled to the data storage device, determines the failure predictions.

7. The method of claim 6, wherein the host computing device moves the applications on the data storage device.

8. A method of maintaining a data storage device having a plurality of physical storage units, comprising:
constructing a model that predicts failure of the physical storage units in the data storage device, wherein the model is trained using empirical data containing operational parameters of physical storage units;
determining failure predictions of the physical storage units in the data storage device using the model;
moving applications in the data storage device based on the failure predictions of the physical storage units in the data storage device;
replacing a first set of the physical storage units in the data storage device predicted to fail by a first time; and
scheduling for future replacement a second set of the physical storage units in the data storage device that are predicted to fail after the first time but before a second time, wherein the first time is one month and the second time is two months.

9. A non-transitory computer-readable medium containing software that maintains a data storage device having a plurality of physical storage units, the software comprising:
executable code that constructs a model that predicts failure of the physical storage units in the data storage device, wherein the model is trained using empirical data containing operational parameters of physical storage units;
executable code that determines failure predictions of the physical storage units in the data storage device using the model;
executable code that moves non-critical applications in the data storage device on to ones of the physical storage units that are predicted to fail;
executable code that maintains the physical storage units in the data storage device marks for replacement a first set of the physical storage units in the data storage device predicted to fail by a first fixed amount of time; and
executable code that schedules for future replacement a second set of the physical storage units in the data storage device that are predicted to fail after the first fixed amount of time but before a second fixed amount of time.

10. The non-transitory computer-readable medium of claim 9, wherein the model is constructed using a Random Forest Classifier model from the Scikit-Learn software package.

11. The non-transitory computer-readable medium of claim 9, wherein using empirical data containing operational parameters of physical storage units includes accessing publicly available empirical data.

12. The non-transitory computer-readable medium of claim 9, further comprising:
   executable code that moves applications deemed critical from the physical storage units in the data storage device that are predicted to fail.

13. The non-transitory computer-readable medium of claim 9, wherein the physical storage units include disk drives and solid state drives.

14. The non-transitory computer-readable medium of claim 9, wherein a host computing device, coupled to the data storage device, includes the executable code that determines the failure predictions.

15. The non-transitory computer-readable medium of claim 14, wherein the host computing device includes the executable code that moves the applications on the data storage device.

16. A non-transitory computer-readable medium containing software that maintains a data storage device having a plurality of physical storage units, the software comprising:
   executable code that constructs a model that predicts failure of the physical storage units in the data storage device, wherein the model is trained using empirical data containing operational parameters of physical storage units;
   executable code that determines failure predictions of the physical storage units in the data storage device using the model;
   executable code that moves applications in the data storage device based on the failure predictions of the physical storage units in the data storage device;
   executable code that maintains the physical storage units in the data storage device marks for replacement a first set of the physical storage units in the data storage device predicted to fail by a first time; and
   executable code that schedules for future replacement a second set of the physical storage units in the data storage device that are predicted to fail after the first time but before a second time, wherein the first time is one month and the second time is two months.

\* \* \* \* \*